Oct. 25, 1932.   A. DINA   1,884,604
FILM GATE
Filed Sept. 20, 1927   5 Sheets-Sheet 1

Fig.1.

Inventor
Augusto Dina
By his Attorney
Howard W. Dix

Oct. 25, 1932.  A. DINA  1,884,604
FILM GATE
Filed Sept. 20, 1927   5 Sheets-Sheet 2

Oct. 25, 1932.    A. DINA    1,884,604
FILM GATE
Filed Sept. 20, 1927    5 Sheets-Sheet 5

Inventor
Augusto Dina
By his Attorney
Howard W. Dix

Patented Oct. 25, 1932

1,884,604

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

FILM GATE

Application filed September 20, 1927. Serial No. 220,689.

The present invention relates to motion picture projecting machines and the like, and more particularly the invention relates to an improved film gate and associated parts therefor.

It is well known in the projection of moving pictures that the film must be kept as cool as possible to eliminate to the greatest extent possible the fire hazards which are present due to the inflammable material of which the film is made. It is also appreciated that the beam of light for projecting the pictures is of intense heat. In practice, the mechanism between which the film is drawn during projection becomes very hot due to some of the beam of light striking this mechanism. Consequently the film becomes very warm even before it reaches the aperture opening where it is exposed directly to the projecting light. It will therefore be noted that the fire hazard becomes more of a problem as the temperature of the film is raised before it reaches the aperture opening.

By preventing the film from becoming heated before it reaches the aperture opening, the fire hazard thereby becomes materially reduced. The improved film gate herein functions most satisfactorily to prevent heat from reaching the film before the film reaches the aperture and to maintain the mechanism as cool as possible.

Due to the delicate mechanism necessary for the intermittent motion necessitating numerous definite positions of the film each minute, it is extremely important that the film guiding and holding members operate perfectly. When the shoes or pads holding the film against the aperture plate exert even slight excess pressure, the wear on the intermittent mechanism and on the film at the sprocket holes is greatly increased. On the other hand, if sufficient pressure is not applied, the pictures projected will not be steady nor properly framed. In order to obtain as near perfect operation as possible, it is not only necessary to have the film pads properly held in position but it is also necessary that the position of the gate be definitely and firmly fixed in its closed position irrespective of the requirement that the gate shall be capable of being opened and closed. If the position of the gate when closed varies at different times, excess pressure is likely to be applied to one side of the film and too little pressure to the other side. The movement of the film, under such conditions, is not up to standard and the wear on the film and on the mechanism materially increases.

In the operation of the prior types of picture projecting machines, pressure is applied to the film to hold it against the aperture plate usually by means of relatively long runners or pads on the respective sides of the aperture. The runners are resiliently mounted and held in position against the film. Even with delicate and exact adjustment the length of the pads prevents uniform pressure throughout. If too much pressure is applied to the film, excessive wear is produced in the delicate mechanisms producing the intermittent movement and also in the film at the sprocket apertures.

The plate on which the pressure pads are mounted, being a part of the gate, is dependent for its adjustment upon the accurate position of the gate when closed. The prior projecting machines have a very crude form of gate for supporting the pads in position. Further, the parts forming gates in the prior machines are not designed to dissipate much of the heat and accordingly heat is conducted to the portions of metal between which the film passes. The danger from fire is therefore excessive.

The present invention overcomes these difficulties by providing pressure members for the film comprising short pads or shoes placed end to end on the respective sides of the film with springs for applying different pressures to respective pads. By permitting some of the pads to apply the tension to the film and others to hold it in vertical position, effective results are obtained with a minimum pressure on the film. The construction of the gate and the parts for closing it are such that it is held in a definite position when closed. The operation of the pads is not disturbed by repeated manipulations of the gate. A series of plates, spaced from each other and rigidly connected through heat insulators, minimize the transfer of heat by conduction and permit dissipation of heat by any suitable means such as by permitting air-currents to flow freely between the respective plates. Naturally the outer plate will be most affected by the heat from the projector light and the prevention of this heat from reaching the inner plate adjacent to the film is important. Suitable guards or shields protect the upper and lower loops of the film. These shields are mounted so that they are not materially affected by the heat.

An object of the present invention is to effect uniform pressure on the moving film, thereby to prevent wear on the machine parts and on the film by maintaining the gate accurately positioned when closed.

Another object of the invention is to dissipate rapidly the absorbed heat in the gate by special construction thereof and by passage of air currents therethrough, and to prevent such heat from reaching the parts adjacent the film.

Another object of the invention is to provide an inexpensive gate, the parts of which are readily accessible for repair and readily replaced if worn or damaged.

Other and further objects of the invention will be obvious upon an understanding of the illustrated embodiment about to be described, and various advantages not referred to herein will occur to one skilled in the art upon reading the description or upon employment of the invention in practice.

A preferred embodiment of the invention has been chosen for purposes of illustration and description and is shown in the accompanying drawings, wherein.

Figure 3:
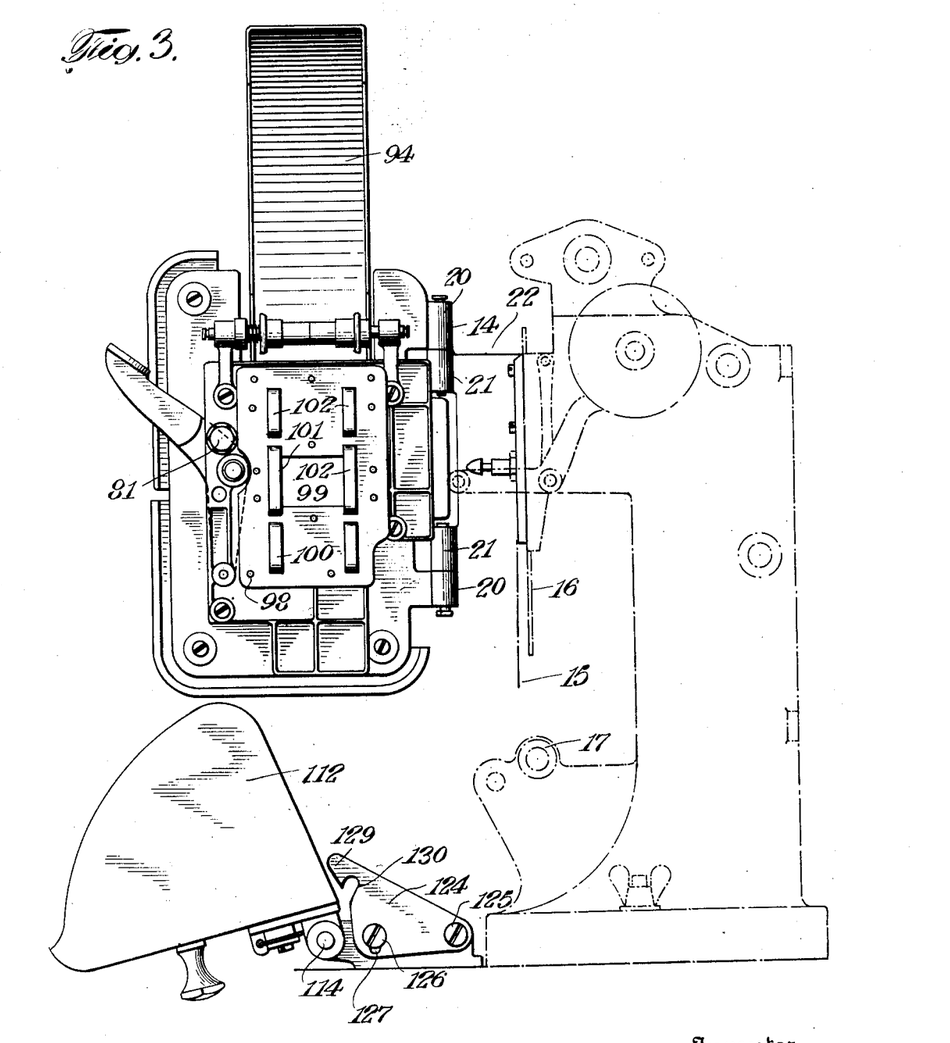
Fig. 3 is a side elevational view, the gate being open at an angle of 90 degrees, giving an elevational view of the inner side of the gate.
Figure 4:
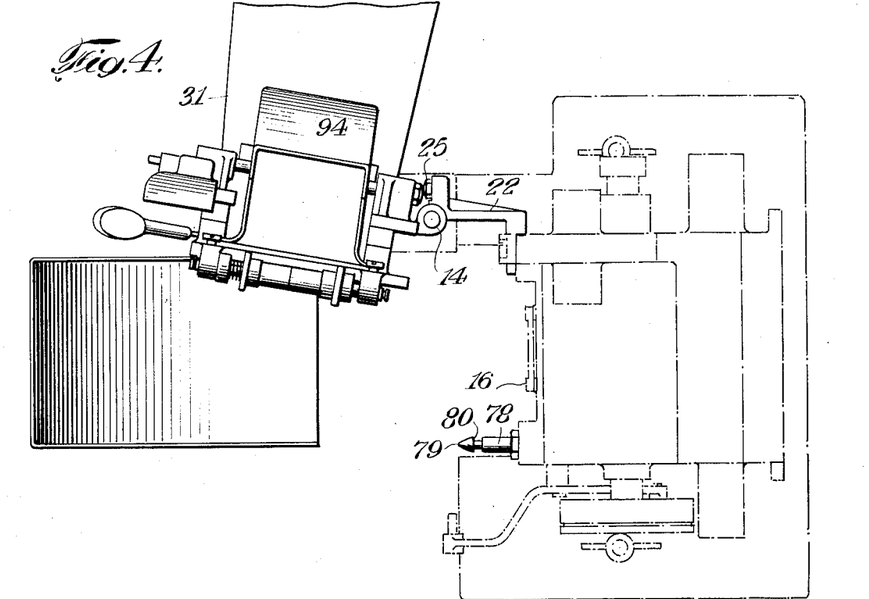
Fig. 4 is a top plan view of the projector with the gate opened to its extreme position.
Figure 5:
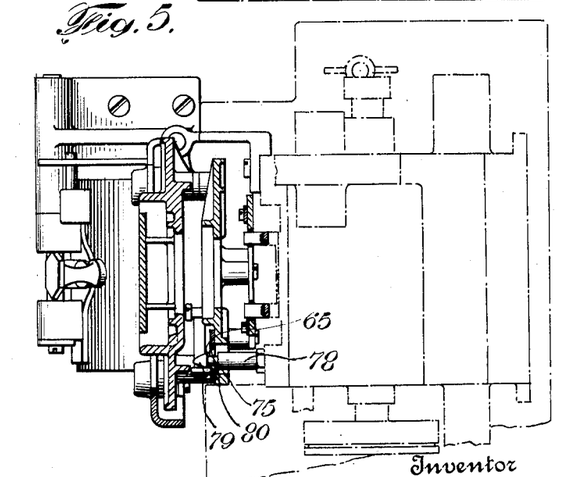
Fig. 5 is a sectional view on line 5—5 of Fig. 2.

The preferred embodiment of the invention about to be described comprises a waffle plate 10 adapted to be hinged or pivotally mounted adjacent the aperture plate of a moving picture projector as shown in Figs. 3 and 4; an intermediate plate 11, removably attached to the side of the waffle plate 10 facing the projector; and an inner plate 12 attached to the opposite side of the intermediate plate 11 to carry tension pads for engaging and holding the moving film against the aperture plate. These three plates, which will be described in detail hereinafter, are rigidly secured in spaced relation to each other, and, with their associated elements, are adapted to swing freely about the hinges 14 into closed and open positions, both of which are definitely fixed by means of stops.

It will be understood that the intermittent sprocket 17 pulls the film 15 downwardly along the aperture plate 16, so that the individual pictures will be consecutively positioned in front of the usual aperture for projection. These parts and the mechanism generally for advancing the film may be of any desired construction since they are not the novel part of this apparatus. The present invention is concerned more particularly with an improved gate with tension pads or shoes properly positioned and retained against the moving film so that the pictures will be most effectively projected on the screen and the wear on the pads and other parts will be reduced to a minimum. In addition the gate is constructed to provide passages for cooling air and chambers which will effectively protect the film from the heat due to some of the light rays being projected on the gate.

The waffle plate 10 which may also be termed the outer plate, since it is furthest from the film and nearest to the projecting light, is preferably formed from a suitable metal, casting, or otherwise formed, and provided on its outer surface with a series of fins or webs 19 for radiation of heat. These fins provide a surface area considerably in excess of the lateral area of the plate and hence dissipate a greater amount of heat than a substantially flat plate would dissipate. At the pivoted side of the plate, the members 20 are formed to co-operate with similar members 21 (Fig. 3) mounted upon the projector head by means of the brackets 22, to form the hinges 14. On the side of the upper member 21 there is a lateral extension 24 (Figs. 1 and 4) having a set screw 25 mounted thereon, the head of which is adapted to engage the head of a pin 27 or some other part of the gate to prevent its being swung more than substantially 90 degrees about the pivot. In other words, the set screw 25 acts as a stop and determines the outward movement of the gate.

A U-shaped web 28 preferably extends from the top of the waffle plate to a point slightly below the center thereof to accommodate and substantially enclose a fire-shutter 29. The web is enlarged at points to facilitate the formation of bearings therein, the upper pair of enlargements 30 provide bearings for the pin 27 which is adapted to support the light shield 31. The latter preferably comprises a sheet metal plate bent into the form of an open square with the closed part of the square at the top and the open part at the bottom. Suitable apertures may be formed in the sides which may be closed by colored glass 34, held in position by inturned flanges 35 on the bottom and sides of the depending portions. The upper side of the shield has an extension 35' bent about the pin 27 to support the shield.

Just below enlargements 30 are another pair of enlargements 36 in the web 28 in which bearings 37 are formed to accommodate a pin 38 extending through the fire shutter 29 and serving as a supporting shaft therefor. One end of the pin is extended beyond the enlargement and bent into a curved form as shown at 39 to co-operate with the toggle 40, connected to the projector in the usual manner to automatically open the shutter when the projector is brought up to speed and to close same when the machine stops. The details of this mechanism for automatically opening and closing the shutter are common to commercial machines and need not be described here in detail. The shutter itself, preferably has a counter-balance 42 so that the part below the pin is slightly heavier than the part above to permit the shutter to be opened readily and to close automatically. The counter-balance when moved is substantially enveloped by the curved portion 44 of the waffle plate, and the projecting lip 43 minimizes further the clearance between the shutter and plate. The web members 45 at the bottom of the U shaped flange 53 act as stops for the automatic shutter and also serve to dissipate heat. A pin 46 which projects inwardly from one of the enlargements 36 engages the counterweight 42 when the shutter is moved to its upper position to provide a stop therefor. Preferably the pin 27, for the light shield, the pin 38 for the automatic shutter and the pin 46, acting as a stop for the upper movement of the shutter are the same size and are all mounted in parallel relation, substantially in the same vertical plane.

In order to permit the gate to be readily opened and closed and to prevent the operator from being accidentally burned, there is provided an upper guard 47 and a lower guard 48 made of insulating material such as bakelite or the like. The upper guard covers an upper corner of the waffle plate likely to be touched in opening the gate, and the lower guard substantially encloses the lower end of the waffle plate and is usually engaged by the operator's hand in closing the gate. The lower guard has a series of apertures 49 to permit free access of air to the waffle plate and both of the guards are spaced sufficiently from the plate to permit free circulation of air.

Figure 10:
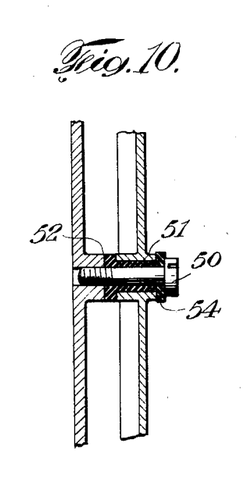
Fig. 10 is a detailed sectional view illustrating the insulated mounting of the guards attached to the waffle plate.

Such spacing is attained preferably by means of screws 50 (Fig. 10) fitting into heat insulating bushings 51 in the apertures 52 of the waffle plate. The free ends of the screws 50 are threaded into the guards to secure them in position. Suitable washers 54 may also be utilized at the ends of the bushings to make the insulation complete. These guards are insulators for both heat and electricity and hence the operator can open and close the gate without fear of being burned by the heated parts or affected by electric charges. At the same time the guards are so placed that they do not prevent dissipation of heat.

Figures 6, 7, 8, 9:
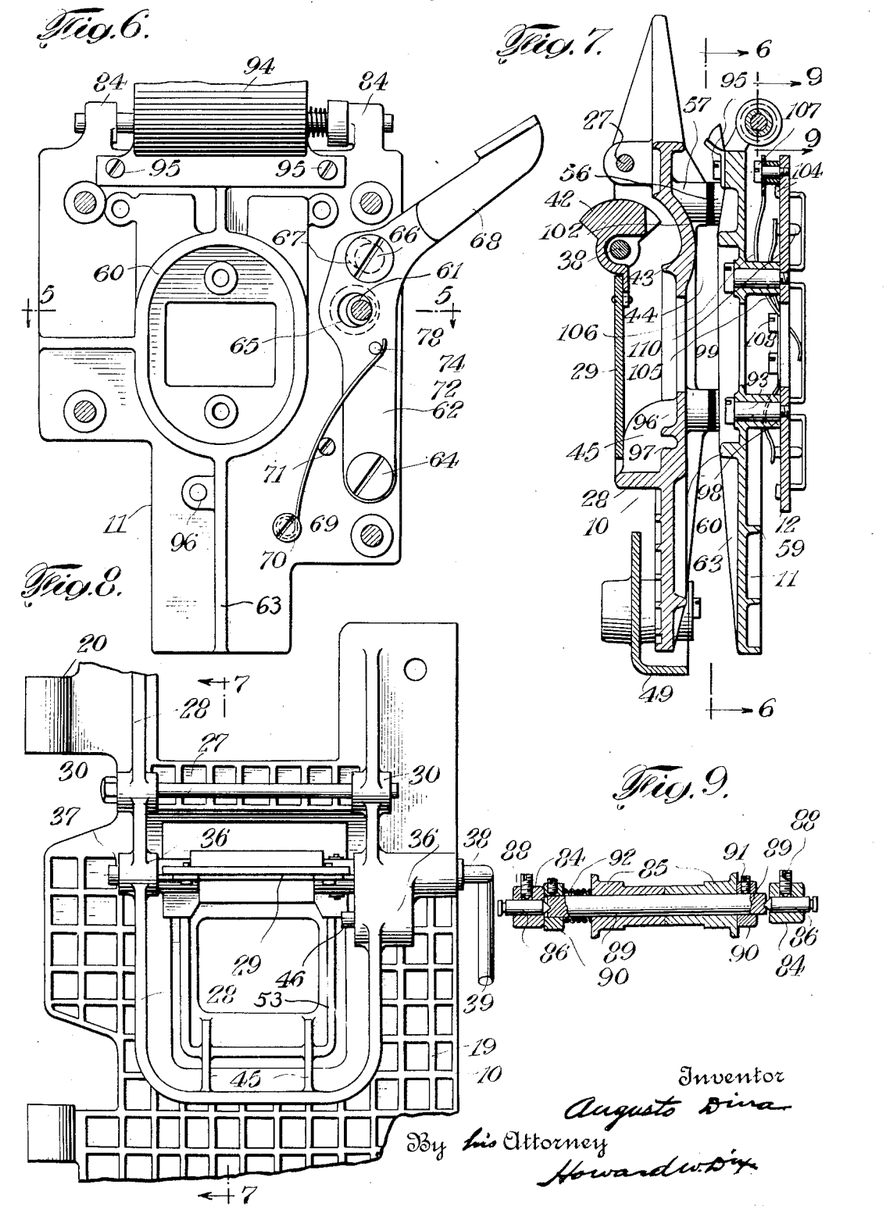
Fig. 6 is a sectional view on line 6—6 of Fig. 7.
Fig. 7 is a vertical sectional view through the gate showing the parts thereof in assembled position.
Fig. 8 is an elevational view of a portion of the waffle plate.
Fig. 9 is a sectional view on the line 9—9 of Fig. 7, illustrating details of the guide roller for the film.

The intermediate plate 11 shown in detail in Figs. 6 and 7, is provided with extensions 56 through which screws pass and engage similar extensions 57 on the waffle plate to secure the intermediate plate and waffle plate in spaced relation to each other. If desirable, the connection between these may be through the intermediation of heat insulating bushings such as those used for mounting the guards on the waffle plates and designated 51 in Fig. 10. Preferably the side of the intermediate plate facing the aperture plate is provided with a series of web members 59 similar to those on the waffle plate. Other webs more irregular in character such as the circular web 60 extending about the window and the webs 63, extending laterally therefrom, may also be provided on the opposite side of the aperture plate 11.

An aperture 61 is formed substantially at the center of one side of said plate and has mounted above it a latch member 62 pivoted at 64 with an aperture 65 substantially directly adjacent the aperture 61. A stud 66 extending through a slot 67 in the upper part of the latch permits a limited movement of the latch by pressure upon the handle 68. A leaf spring 69 having one end secured to a stud 70 and bent about another stud 71 at its center with its free end 72 hooked over a projection 74, retains the latch with its handle in uppermost position, with the vertical portion resiliently retained in its extreme left position. The latch member 62 may be manufactured in any suitable manner but is preferably stamped with the several apertures therein in a single operation. Thereafter the aperture 65 is counter-sunk the full thickness of the member 62 as shown at 75 and a suitable handle of bakelite or the like secured to the free end of the latch.

A latch post 78 is secured to the main frame of the projector in any suitable manner and has its outer end tapered as shown at 79 with a shoulder 80 formed directly back of the taper by means of an annular channel. The position of the latch post is such that when the gate is closed the end of the post will pass through the aperture 61 in the intermediate plate and the tapered end of the post will engage the counter-sunk side of the aperture 65 in the latch member 62. Engagement of the tapered surface of the post with the tapered edge of the aperture 65 cams the latch member outwardly until it passes the shoulder 80 when it snaps into lock position with the flat surface adjacent the aperture 65 in engagement with the perpendicular shoulder 80 whereby the gate is definitely fixed in position. Hence the gate may be readily opened by pressure upon the latch member 62 and automatically locked by movement to closed position. This intermediate plate 11 preferably carries an adjustable member 81 which engages the main frame of the projector head when the gate is closed. By adjusting this member the exact position of the gate when closed may be regulated and thus prevent any oscillating movement of the gate itself during operation of the machine. The member 81 is adjusted so that the latch 62 will be held against shoulder 80.

At the upper end of the intermediate plate there is provided a pair of extensions 84 for rotatably mounting the film guide rollers 85. Preferably a pair of pins 86 extend through these extensions and are secured by set screws 88 in position to engage the ends of the shaft 89, rotatably mounting the same. A pair of collars 90 are mounted at the respective ends of the shaft by means of set screws 91. A coiled spring 92 separates one of the collars from one end of one of the guide rollers 85 so that the guide roller which is formed in two parts may be oscillated along the shaft 89 due to the width of the passing film. The amount of pressure required to move the guide roller may be varied by means of the collars 90 and the position may be changed in the same manner.

Secured also to the upper end of the intermediate plate is a guard or shield 94 which protects the upper loop of the film. The guard may be secured in position in any suitable manner but preferably by means of the screws 95. By being mounted on the intermediate plate less heat is conducted to it than would be the case if mounted upon the waffle plate which is primarily subjected to the light projecting rays. The intermittent plate, being shielded by the waffle plate and heat insulated therefrom, is much cooler and therefore the temperature of the guard is maintained at a minimum.

A series of posts 93 are cast on the opposite side of the intermediate plate through which the apertures 96 extend. Suitable screws 97 extend through these apertures to engage the inner plate 12 and maintain it rigidly in position as shown at 98. The inner plate may be made from a flat piece of metal with a window 99 at its center, properly aligned with the windows in the outer and intermediate plates. On each side of the window 99 is a series of elongated slots 100 here shown as three in number with the center pair of slots 101 somewhat longer than the end slots. Mounted in these slots are suitable presser pads or shoes 102 with their film engaging surfaces properly ground and lapped to the required degree of smoothness. The pads are prevented from falling out by means of the flanges 104 and are resiliently retained in the slots by means of suitable springs 105 and 106. The springs 106 are mounted at the upper end of the plate by means of screws 107, and hold the middle pads or shoes in position, and the springs 105 are secured at their centers to the plate by means of the screws 108, to hold the end shoes in position by means of the pins 110.

A further description of the plate is not believed to be necessary herein since a divisional application is being filed to cover the features of this plate. It will be understood that when the gate is closed the presser pads 102 rest against the edges of the intermittently moving film and apply sufficient pressure to hold the film against the aperture plate and to prevent any disarrangement thereof. The film is given its intermittent motion by the intermittent sprocket 17 mounted below the aperture opening. Too much pressure on the film by the shoes, not only tends to wear out the portion of the film engaged by the shoes, but produces severe strains on the intermittently operating mechanism as well as severe strains at the sprocket apertures in the film. On the other hand, if too little pressure is applied to the film, the pictures are noticeably unsteady. The individual presser pads in the present construction permit a pressure to be applied to the end pairs of pads somewhat in excess of that applied to the center pair of pads. In this way, the end pads give the necessary tension to the film in front of the aperture opening, whereas the pads directly adjacent the apertures supply sufficient pressure to hold the film in correct position in respect to the aperture opening. Such construction has been found to give excellent operative results with minimum wear on both film and pads as well as the other mechanisms. With the pads and springs properly designed as to areas and pressures respectively, there will readily be obtained the most efficient pressure per square inch to give uniform and "non-jumping" projection as well as reducing the wear on the film and on the operating parts of the machine. In other words, maximum use is obtained with minimum wear on the film, pads and mechanism.

The tension of the springs and the pressure applied to the shoes is definitely fixed and no adjustments are necessary. Further, due to the fact that the inner plate 12 is separated by the spaced heat insulated plates 10 and 11, the high temperature of the light beam does not reach these parts and hence the springs do not become affected by heat. If it is desired to replace the springs or any of them, this may be accomplished quickly by removal of the plate.

It will be seen in the construction herein that there are three spaces or channels in the gate for the air to move and carry the heat away. The first channel is between the waffle plate 10 and the intermediate plate 11, and a very material amount of the undesired heat is dissipated by the waffle plate itself and by the air rising in or passing through this first channel. The second space or channel is between the other side of the intermediate plate 11 and the plate 12, while the third channel or space is formed by the plate 12 and the distance the presser pads hold the film from the plate 12. With the construction of this improved gate there will be little heat in the third channel. Thus, the film is kept very cool and the fire hazard is very materially reduced, and the presser pads give maximum work without being subjected to changing conditions due to heat.

Figure 1:
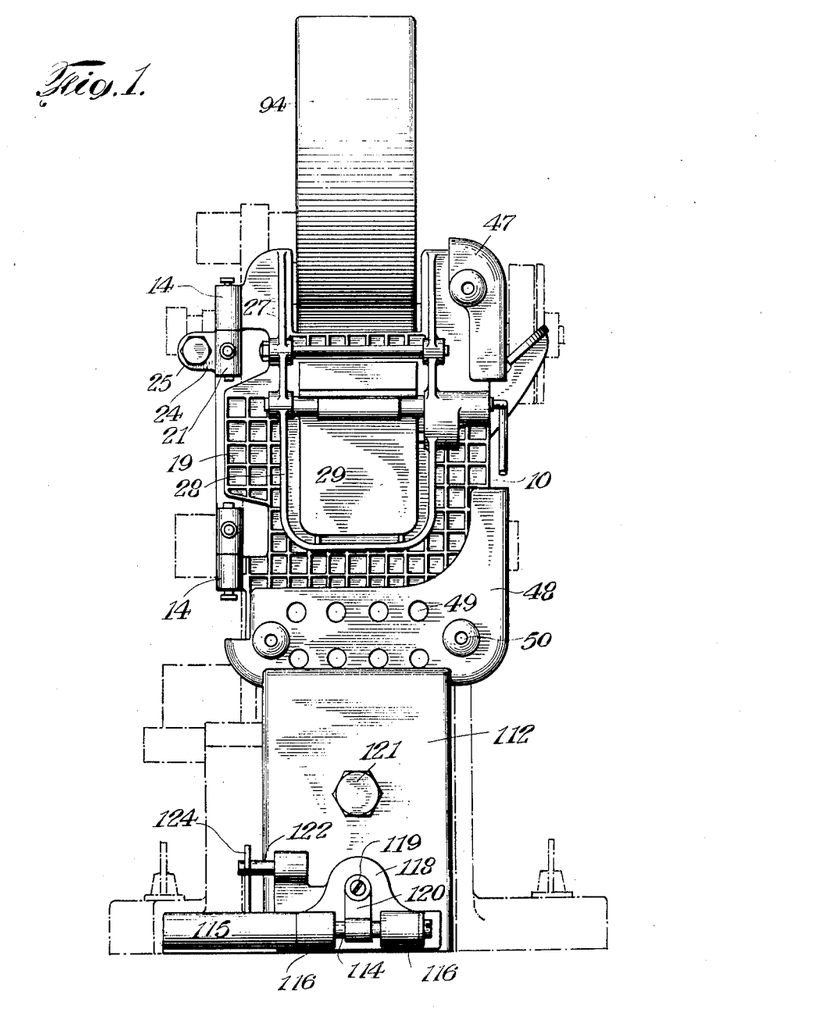
Fig. 1 is a front elevational view of a projector head with the gate closed.
Figure 2:
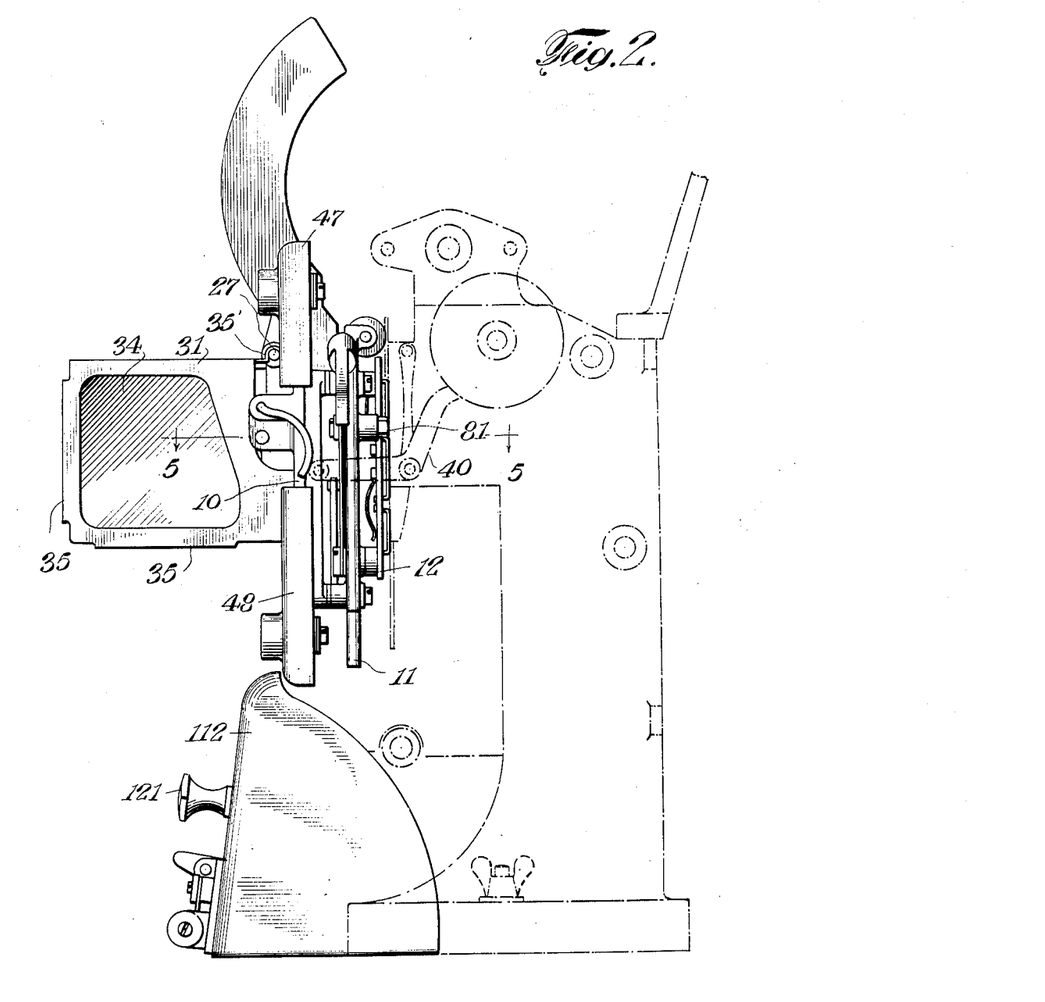
Fig. 2 is a side elevational view of the projector head with the gate closed and with a light shield in position.

A guard or shield 112 is mounted below the gate to protect the lower loop as shown more particularly in Figs. 1, 2, and 3. A suitable pin or shaft 114 is mounted in the bearing 115 and the guard is secured thereto by means of the bearings 116 formed in a bracket 118 attached to the guard by screw 119. A spring 120 presses upon the shaft 114 to give sufficient friction to hold the guard in any position. A suitable knob 121 is secured to the center of the guard to facilitate opening and closing. A pin 122 extends outwardly from one side of the guard to engage a latch member 124 which is pivotally mounted at 125 and permitted a limited movement by means of the stud 126 in slot 127. When the guard is turned to its closed position the pin 122 engages a cam surface 129, pressing the latch 124 upwardly and eventually engaging a stop surface 130 at which time the latch closes about the pin under the force of its own weight. The surface 130 is preferably formed in the shape of an arc with the pivot 125 as a center, so that when the pin engages the surface 130 there will be no camming action.

The improved film gate herein disclosed for illustration is adapted to be employed on a projecting machine known as the Powers machine, but the principles of the invention are capable of being employed in any projecting machine.

It will be seen that the present invention fully protects the film from the upper to the lower loop. The gate by means of its three spaced plates, provides a pair of chambers for the circulation of air within itself and a third chamber between the inner plate and the aperture plate. These chambers and the insulated mounting between the plates prevent the conduction of heat and at the same time facilitate the passing of natural currents of cooling air. The parts are simple in construction and easy to manufacture from commercial material. The gate may be assembled or disassembled readily for repairs when needed. It automatically locks itself in a definite position when closed, giving the required pressure to the film on the aperture plate without necessitating adjustments to the springs holding the tension shoes. Further, all the parts are rugged in construction and fully capable of withstanding the rough usage to which they may be subjected.

As various changes may be made in the above embodiment without departing from the spirit of the invention, it is to be understood that all matter herein is to be interpreted as illustrative and not in a limited sense.

Having thus described the invention, what is claimed is:

1. In a gate for projecting machines and the like, the combination of an outer plate having web members for dissipating heat, an inner plate having members mounted thereon for engaging the film, and a plate intermediate said inner and outer plates, said intermediate plate having web members for dissipating heat.

2. In a gate for projection machines and the like, the combination of an outer plate, an inner plate having members mounted thereon for engaging the film, and a plate intermediate said inner and outer plates, having web members for dissipating heat, said plates being spaced from each other to provide chambers for the passage of air therebetween.

3. In a gate for projecting machines and the like, the combination of an outer plate, an inner plate having members protruding therefrom for engaging the film, thereby affording a space between the film and said plate for the passage of air, said inner and outer plates being insulated from each other and also spaced to provide an air chamber therebetween.

4. In a gate for projection machines and the like, the combination of an outer plate, a plurality of heat dissipating fins on said plate and extending throughout a substantial area thereof, and another plate mechanically supported apart from said first plate and being substantially insulated against heat transfer thereto, said spacing providing a passageway for cooling air between said plates.

5. In a gate for projecting machines and the like, the combination of an outer plate, and another plate secured thereto and spaced therefrom to provide a passage therebetween to facilitate the upward passage of currents of cooling air, said plates being insulated from each other and the outer sides of each of said plates having web members for the dissipation of heat.

6. In a gate for projecting machines and the like, the combination of an outer plate adjacent the light projecting apparatus, second plate secured thereto and heat insulated therefrom, a third plate having means thereon for engaging the film, and a shield for the upper loop secured to the upper portion of said second plate whereby the conduction of heat to said shield is reduced to a minimum.

7. In a gate for projecting machines and the like, the combination of a guard of bakelite or the like, having apertures therein to permit access of air to the gate, a plurality of insulating washers separating said guard from adjacent portions of the gate to prevent the conduction of heat from one to the other, whereby the gate may be opened and closed by the operator without danger of being burned.

8. In a gate for projecting machines, and the like, the combination of an outer waffle plate for dissipating heat, an inner plate having members adapted to engage the film, and a plate having web members thereon for dissipating heat intermediate said inner and outer plates, all of said plates having aligned windows through which the projecting light may pass.

9. In a gate for projecting machines and the like, the combination of an outer waffle plate for dissipating heat, an intermediate plate, an inner plate, a plurality of tension pads on the respective sides of said inner plate adapted to engage the sides of the film, each of said pads being resiliently retained in position.

10. In a gate for projecting machines and the like, the combination of an outer plate, an intermediate plate, an inner plate, certain of said plates having web members for dissipating heat, a window in said inner plate, and a plurality of resiliently retained tension pads on each side of said window for engagement with the film.

11. In a projecting machine, the combination of a gate, a light shield, means for supporting said light shield, and a stop for limiting the outer movement of said gate, said shield supporting means being adapted to engage said stop.

12. In a projecting machine, a film guard, a latch mounted on said machine for automatically locking said film guard in position, said latch being pivotally mounted and having a shoulder below the guard engaging means formed on a radius having the pivot as a center whereby an effective stop will be provided for the guard irrespective of the position of the latch.

13. In a projecting machine, a gate, a latch for said gate comprising a stationary post tapered at its outer end, an abrupt shoulder adjacent said taper, and a co-operative lever on the movable gate, said lever having an aperture therein larger than said post, the periphery of said aperture being tapered to engage the tapered end of said post, the other side of the aperture presenting a flat surface to engage the shoulder on the post.

14. In a projecting machine, a gate, a latch for said gate comprising a stationary post tapered at its outer end, an abrupt shoulder adjacent said taper, a cooperating lever on the movable gate, an aperture in said lever countersunk to provide a tapered edge for engaging said post, and resilient means for holding said lever with the side of said aperture in the path of the tapered end of the post, whereby the gate is automatically locked when closed.

15. In a projecting machine, the combination of a gate comprising a pressure pad having members thereon adapted to apply pressure to the film, a latch for said gate, a post having a shoulder thereon adapted to be engaged by the latch to determine the outer position of the gate when closed, and adjustable means for determining the inner position of said gate so that the pressure applied by the pad will be the same in all instances.

16. In a projecting machine, the combination of a gate, a latch for said gate, a post tapered at its outer end, an abrupt shoulder adjacent said taper whereby the gate automatically locks upon being closed, and means for holding said gate firmly against said shoulder to definitely determine its position.

AUGUSTO DINA.